US011995961B2

(12) United States Patent
Williams

(10) Patent No.: US 11,995,961 B2
(45) Date of Patent: May 28, 2024

(54) SKILL-BASED BINGO GAME SYSTEM AND METHOD

(71) Applicant: Robert Williams, Sliema (MT)

(72) Inventor: Robert Williams, Sliema (MT)

( * ) Notice: Subject to any disclaimer, the term of this patent is extended or adjusted under 35 U.S.C. 154(b) by 0 days.

(21) Appl. No.: 17/654,396

(22) Filed: Mar. 10, 2022

(65) Prior Publication Data

US 2023/0022142 A1 Jan. 26, 2023

Related U.S. Application Data

(60) Provisional application No. 63/159,301, filed on Mar. 10, 2021.

(51) Int. Cl.
*G07F 17/32* (2006.01)

(52) U.S. Cl.
CPC ...... *G07F 17/3295* (2013.01); *G07F 17/3211* (2013.01); *G07F 17/3244* (2013.01); *G07F 17/3272* (2013.01); *G07F 17/329* (2013.01)

(58) Field of Classification Search
None
See application file for complete search history.

(56) References Cited

U.S. PATENT DOCUMENTS

| | | | | |
|---|---|---|---|---|
| 4,247,114 | A | 1/1981 | Carroll | |
| 4,312,508 | A | 1/1982 | Wood | |
| 4,635,938 | A | 1/1987 | Gray | |
| 5,133,559 | A | 7/1992 | Page | |
| 7,727,064 | B1 * | 6/2010 | Luciano, Jr. | G07F 17/329 463/19 |
| 11,183,018 | B2 * | 11/2021 | Marks | G07F 17/3258 |
| 2015/0248807 | A1 * | 9/2015 | Berman | G07F 17/3293 463/11 |
| 2017/0323524 | A1 * | 11/2017 | Washington | G07F 17/3209 |
| 2020/0394873 | A1 * | 12/2020 | Casey | G07F 17/3267 |
| 2023/0043388 | A1 * | 2/2023 | Berman | A63F 3/062 |

* cited by examiner

*Primary Examiner* — Ronald Laneau
(74) *Attorney, Agent, or Firm* — FisherBroyles, LLP; Rob L. Phillips

(57) ABSTRACT

Disclosed is a system and method for conducting a multiple choice, skill-based bingo game. One object of the system is to facilitate single player or multi-player bingo games utilizing specialized bingo cards and a random number generator generating outcomes based on (i) a subset of bingo balls formed of groups of like numbers including a group of strikes or (ii) rolls of a plurality of dice including at least one outcome deemed a strike.

16 Claims, 22 Drawing Sheets

SKILL-BASED BINGO GAME SYSTEM AND METHOD

CROSS-REFERENCE

This application claims priority to U.S. Patent Application No. 63/159,301 filed Mar. 10, 2021 which is incorporated by reference herein for all purposes.

FIELD OF THE INVENTION

The embodiments of the present invention relate generally to a casino game system facilitating games of bingo.

BACKGROUND

The oldest known bingo game dates to the mid-1500 s as a lottery game in Italy. Players had cards with numbered squares on them with winning numbers being drawn out of a sack. A European game called "Beano" was first played at a carnival near Atlanta, Georgia in 1929. The game was renamed after a patron overheard someone accidentally yell "bingo" instead of "beano."

The rules of bingo are simple and well-known. Players buy one or more bingo cards numbered from 1 to 75 in America and 1 to 90 in Europe. In America, each bingo card contains 24 numbered squares and 1 blank center square, situated on a 5 by 5 grid. The columns are labeled "B" (numbers 1-15), "I" (numbers 16-30), "N" (numbers 31-45), "G" (numbers 46-60), and "O" (numbers 61-75). When the game starts, random numbers are drawn and the player holding the bingo card forming a completed predefined bingo pattern first, wins the prize. A bingo pattern typically consists of a line with five numbers in diagonal, horizontal or vertical row or combinations thereof. The bingo numbers on the bingo cards are randomly assigned to the squares on the bingo card. Every bingo card is unique.

It would be advantageous to develop a new, exciting and unique bingo game system for playing new games of bingo with a skill component.

SUMMARY

The embodiments of present invention involve a system and method for conducting a multiple-choice bingo game. One object of the embodiments of the present invention is to obtain the most bingos. In one embodiment, the system utilizes a set of six-sided dice or means for generating random dice rolls or ball numbers, and specially designed bingo cards. Unlike traditional bingo, the embodiments of the present invention employ dice or a unique ball subset including multiple balls having the same numbers and bingo cards having multiple same-numbered spaces. Regardless of the method of generating the bingo numbers, bingo numbers may be generated and used more than once.

By generating the same bingo numbers more than once and using bingo cards with the same numbers depicted more than once, a skill element is added to the bingo game. The skill being based on players choosing between multiple bingo card "spaces" to daub or mark. The number of dice or balls in play defines the probability of the occurrence of each space on any particular random occurrence. Furthermore, the method is the reverse of traditional bingo because every player plays the same bingo card configuration rather than each bingo card containing unique and different configurations. Moreover, the bingo card contains every possible number outcome as opposed to a subset of the possible outcomes like traditional bingo. Also, unlike traditional bingo, players play a single card and may generate their own random numbers by rolling the dice or selecting a ball from the subset of balls.

The unique system and methodology detailed herein adds a skill element to the game of bingo since players must choose between multiple spaces to daub/mark. Furthermore, the method of play is the complete reverse of traditional bingo because players each play the exact same bingo card configuration and only some of the possible balls are in play, as opposed to traditional bingo where each card is different containing only a sub-set of the numbers in play. In one embodiment, the system incorporates a theme like baseball or cricket.

Other variations, embodiments and features of the present invention will become evident from the following detailed description, drawings and claims.

DETAILED DESCRIPTION

Figure 1A:
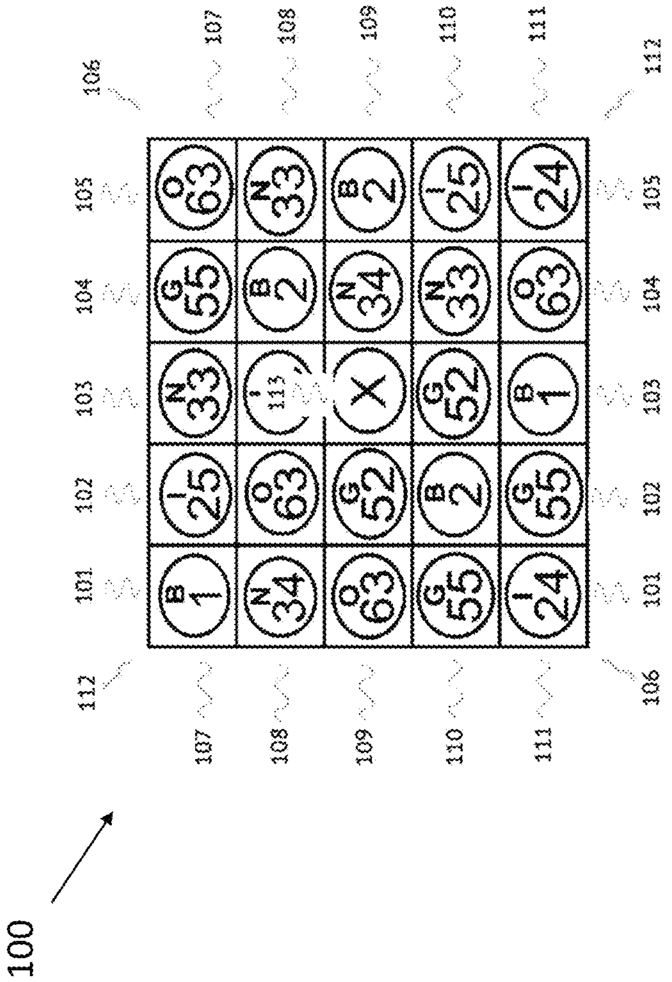
FIG. 1A illustrates a first exemplary bingo card according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a standalone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "gaming machine" should be understood to be any one of a general purpose computer, as for example a personal computer, laptop computer, standalone machine, a client computer configured for interaction with a server, a special purpose computer such as a server, or a smart phone, soft phone, tablet computer, personal digital assistant or any other machine adapted for executing programmable instructions in accordance with the description thereof set forth above.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "gaming machine" should be understood to be any one of a general purpose computer, as for example a personal computer, laptop computer, standalone machine, a client computer configured for interaction with a server, a special purpose any other machine adapted for executing programmable instructions in accordance with the description thereof set forth above.

An American embodiment of the present invention is a system using five-by-five matrix bingo cards containing twenty-five (25) squares and one free space/square in the center and a European embodiment is a system using six-by-six matrix bingo cards containing thirty-six (36) squares and two free spaces/squares in the center.

Figure 1B:
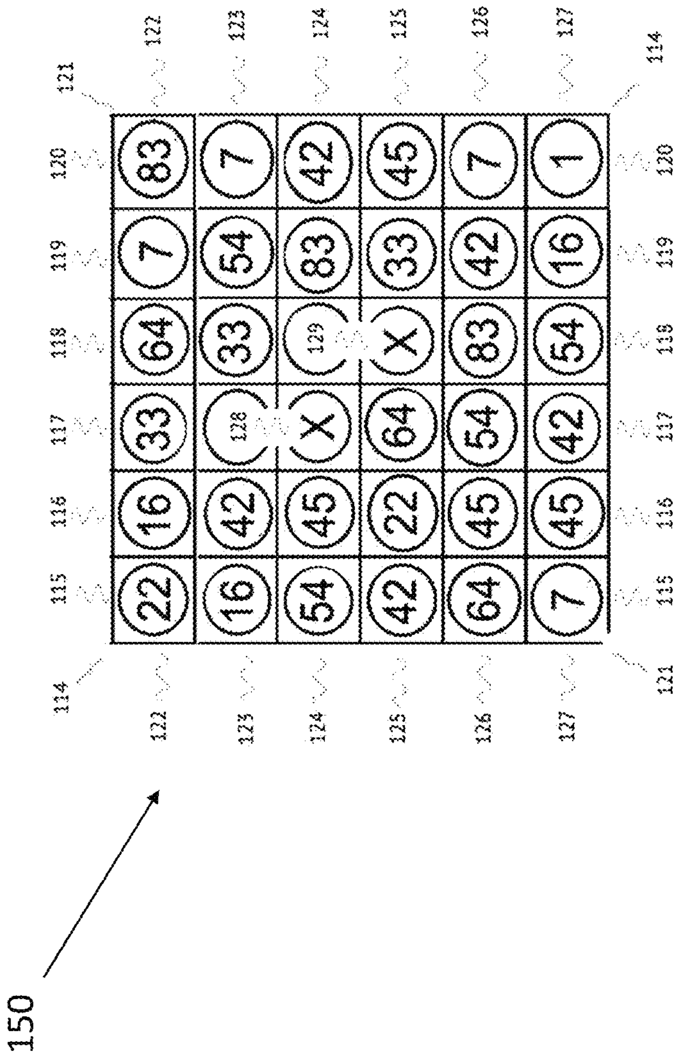
FIG. 1B illustrates a second exemplary bingo card according to the embodiments of the present invention.

Now referring to FIG. 1A, American bingo card 100 differs from the traditional American bingo card because each of the columns 101-105, rows 107-111 and diagonals 106, 112 has the same probability of surrendering a bingo. As shown in FIG. 1B, the thirty-six (36) squares European bingo card 150 differs from the traditional European bingo card because each of the columns 115-120, rows 122-127 and diagonals 114, 121 has the same probability of surrendering a bingo. Unlike traditional bingo cards, each of the bingo cards 100, 150 depicts some numbers more than once. For example, the American bingo card 100 depicts "063" four times and the European bingo card 150 depicts the number "7" four times.

Figure 1C:
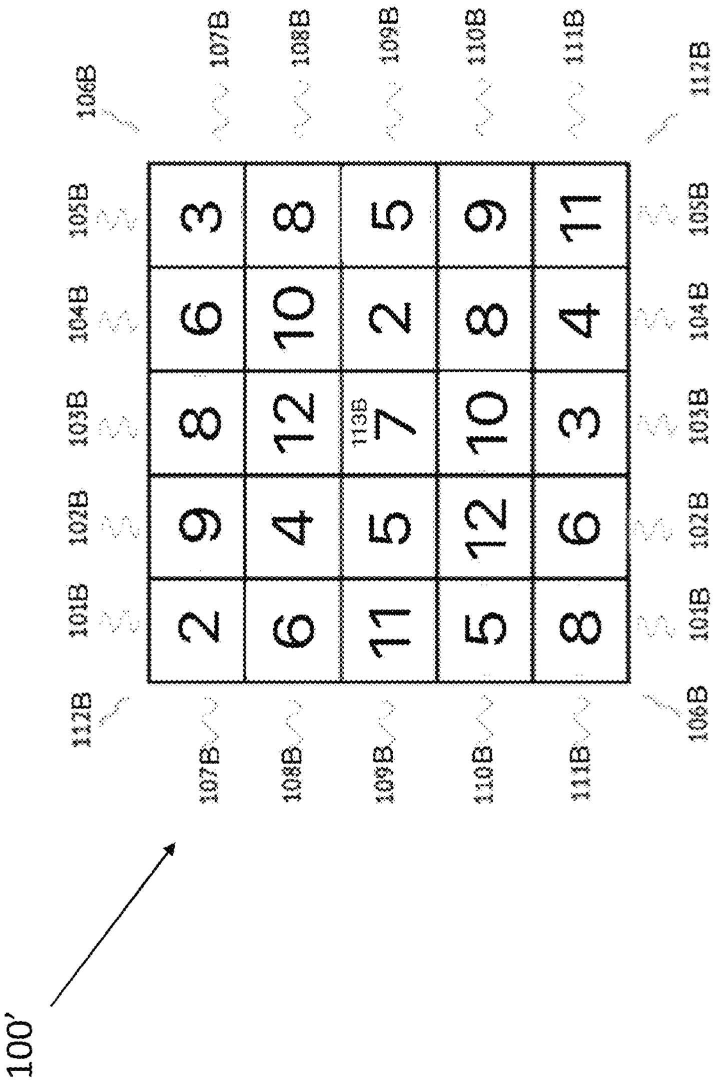
FIG. 1C illustrates a third exemplary bingo card for use with two sixed-sided dice according to the embodiments of the present invention.
Figure 1D:
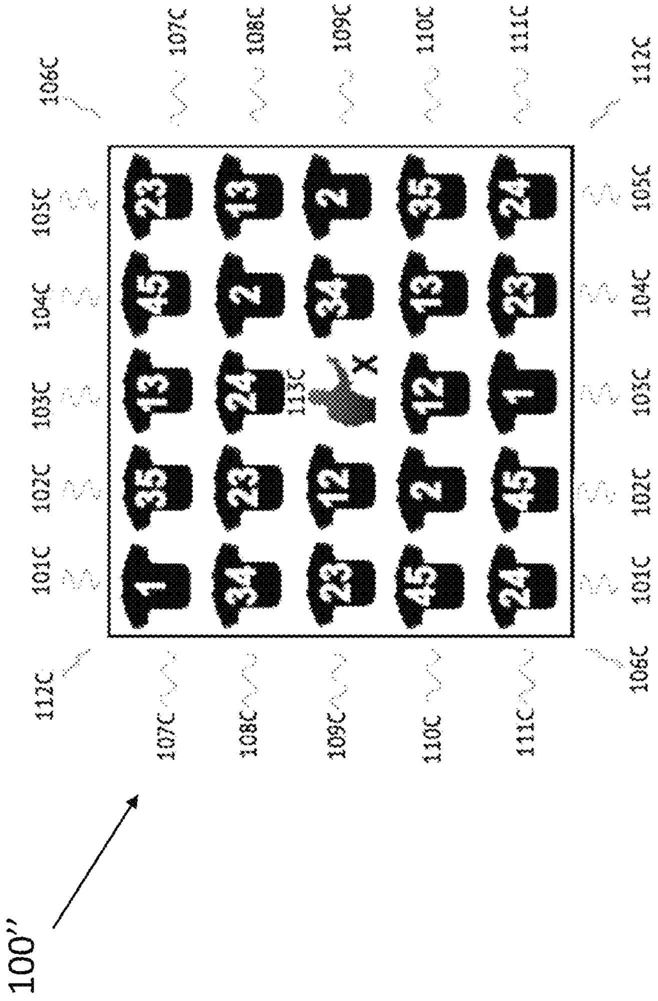
FIG. 1D illustrates a fourth exemplary bingo card with a baseball theme according to the embodiments of the present invention.

FIG. 1C shows an American bingo card 100' for use with two six-sided dice as detailed below. American bingo card 100' shows a "7" 112B in the center square representing a strike in the dice embodiment. FIG. 1D shows an American bingo card 100" having a baseball theme according to the embodiments of the present invention. American bingo card 100" shows an umpire and X 113B in the center square representing a strike.

Unlike traditional bingo, with the embodiments of the present invention, the bingo numbers on the American and European bingo cards 100, 150 are not restricted to certain columns (e.g., the "B" column restricted to bingo numbers 1-15, the "I" column restricted to bingo numbers 16-30; the "N" column restricted to bingo numbers 31-45; the "G" column restricted to bingo numbers 46-60 and the "O" column restricted to bingo numbers 61-75). To the contrary, any bingo number can be placed in any column. Unlike traditional bingo, the bingo cards also contain all bingo numbers in play whereas traditional bingo cards contain only subsets of all bingo numbers in play.

The X-square 113 in the American bingo card and X-squares 128, 129 in the European bingo card represent strikes rather than free spots associated with traditional bingo.

In one American embodiment, the system uses subsets of the three hundred eighty-five (385) possible bingo balls in the twenty-five (25) squares and, in one European embodiment, the system uses four-hundred and sixty (460) possible bingo balls in the thirty-six (36) squares with balls drawn randomly one-at-a-time. The system may also employ dice to generate the random numbers. In one embodiment, two six-sided dice are used so that thirty-six possible outcomes can be generated.

Figure 2A:
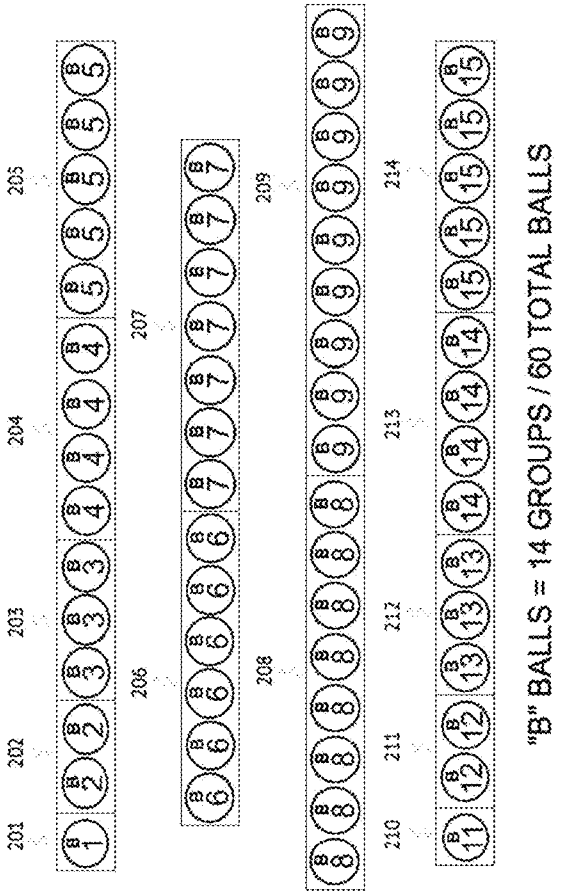
FIGS. 2A-2F illustrate exemplary American bingo ball sets according to the embodiments of the present invention.
Figure 2B:
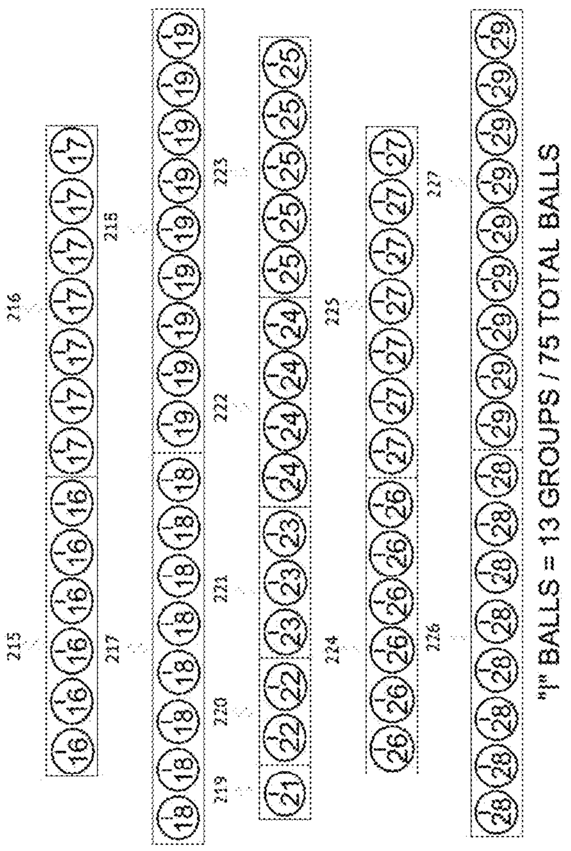
Figure 2C:
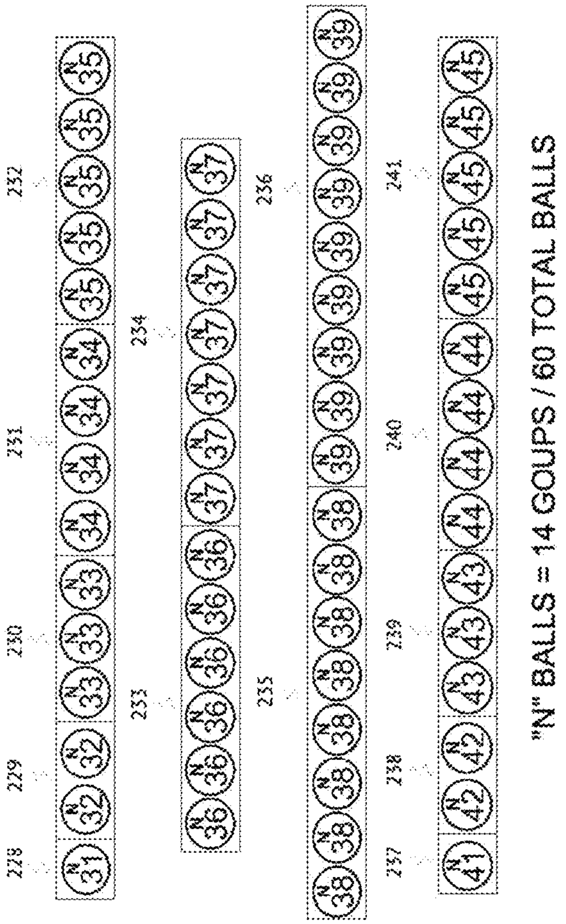
Figure 2D:
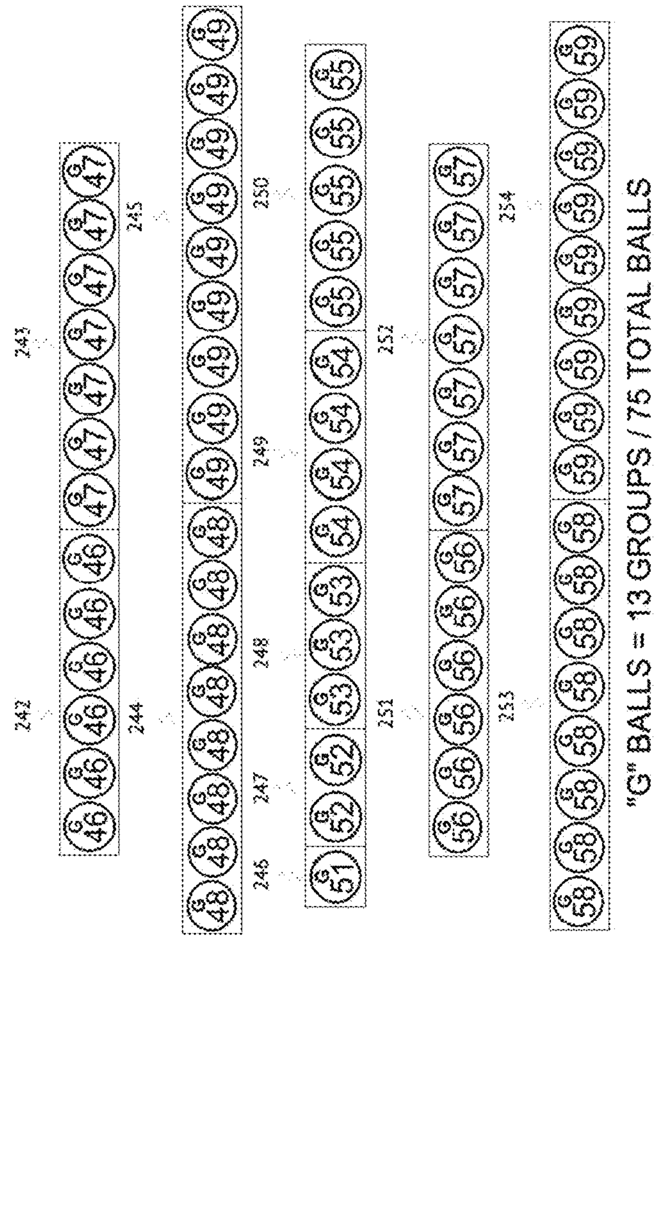
Figure 2E:
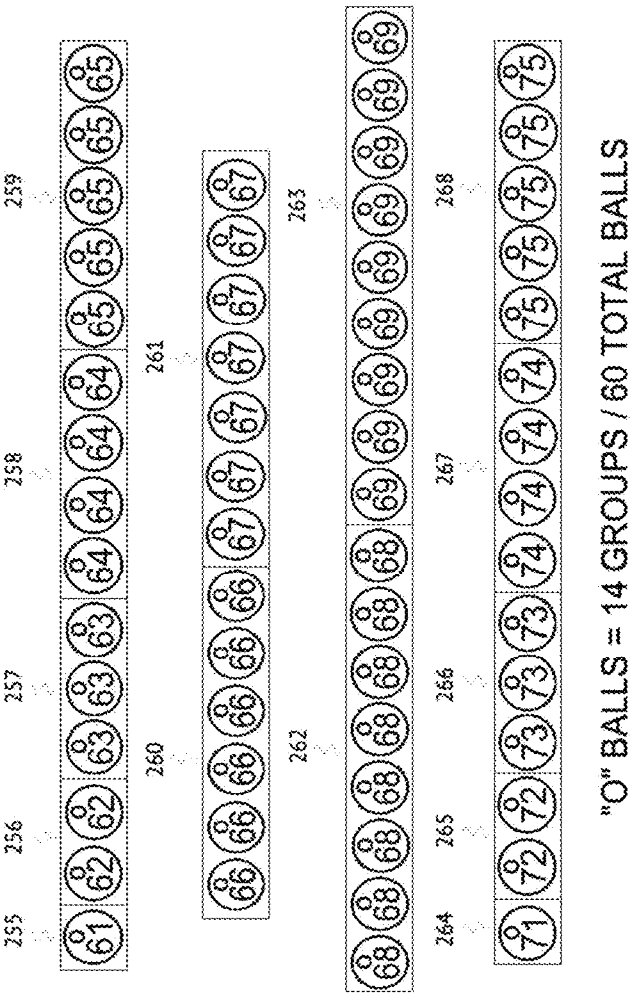
Figure 2F:
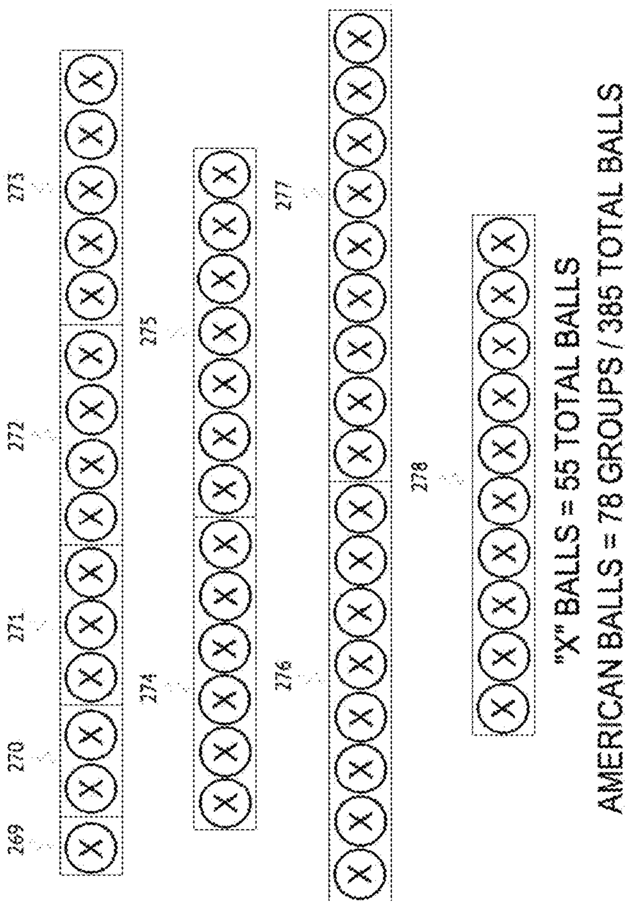
Figure 2G:
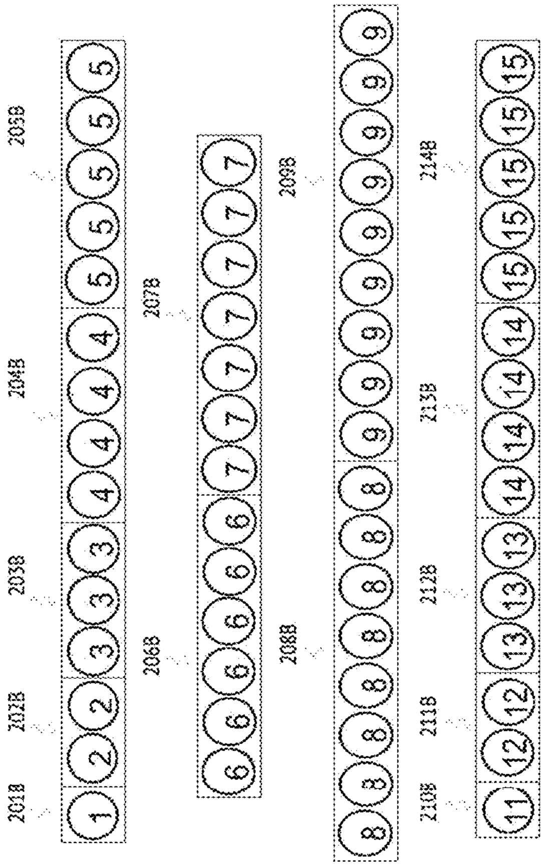
FIGS. 2G-2M illustrate exemplary European bingo ball sets according to the embodiments of the present invention.
Figure 2H:
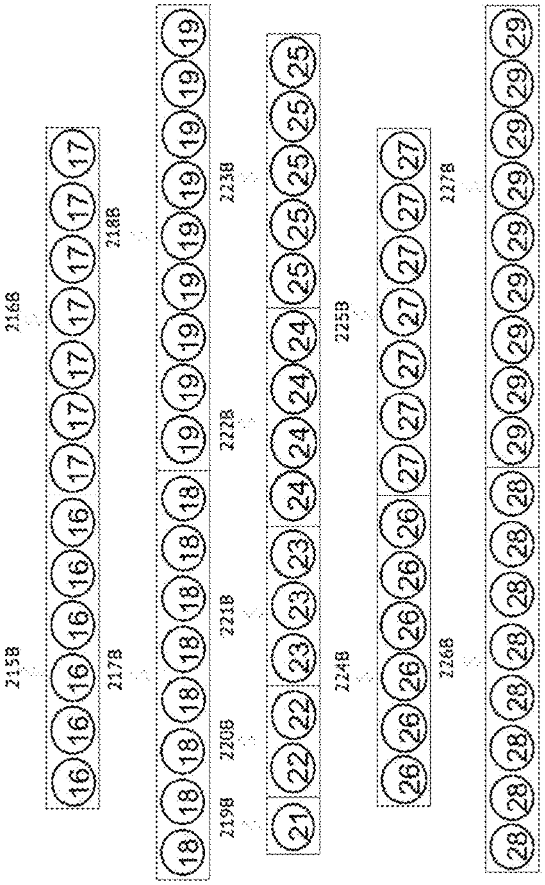
Figure 2I:
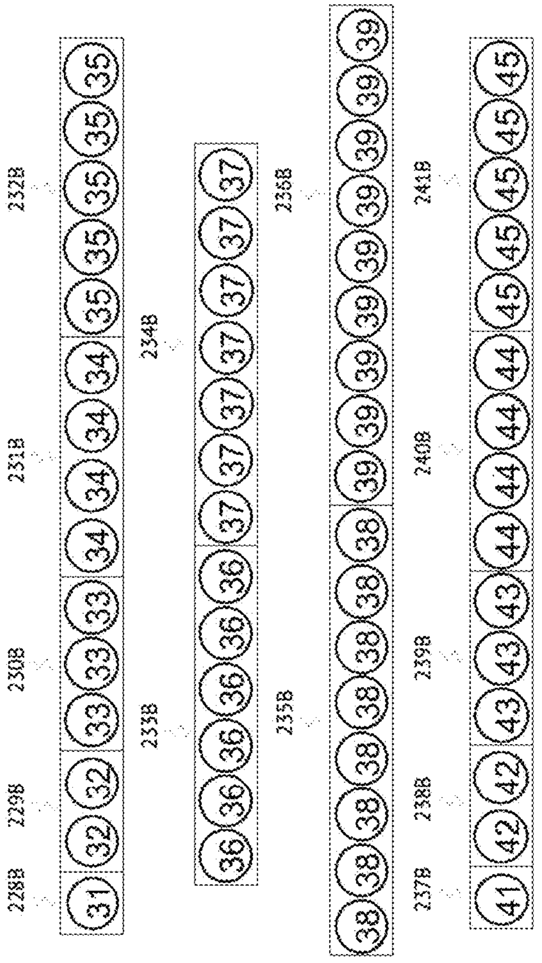
Figure 2J:
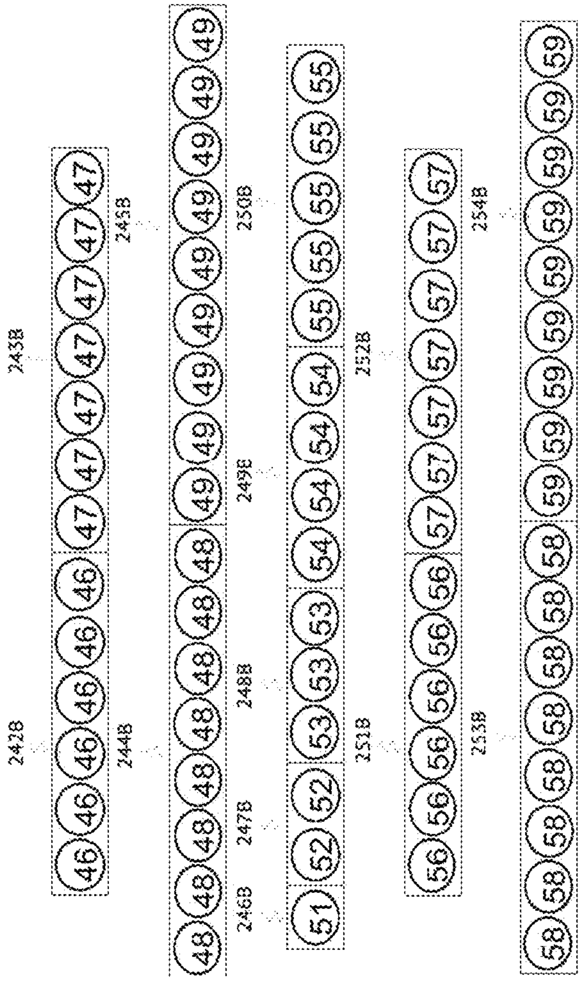
Figure 2K:
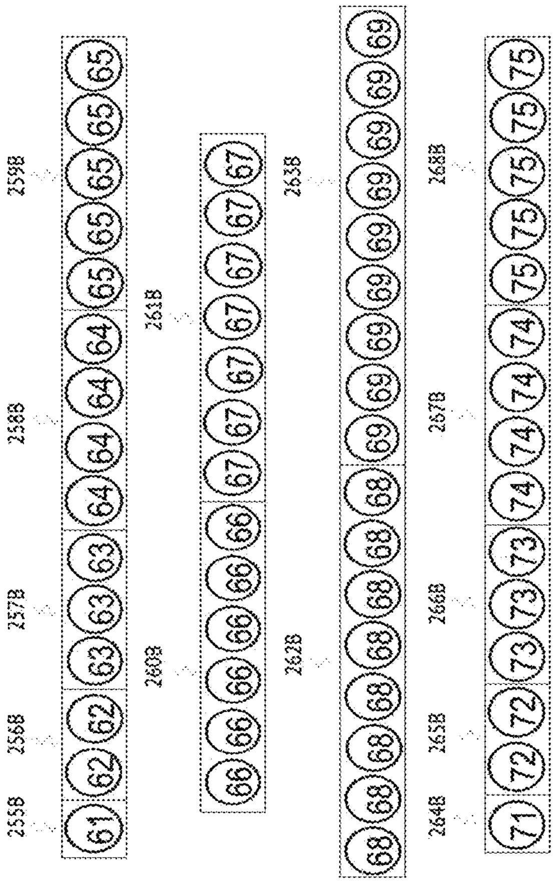
Figure 2L:
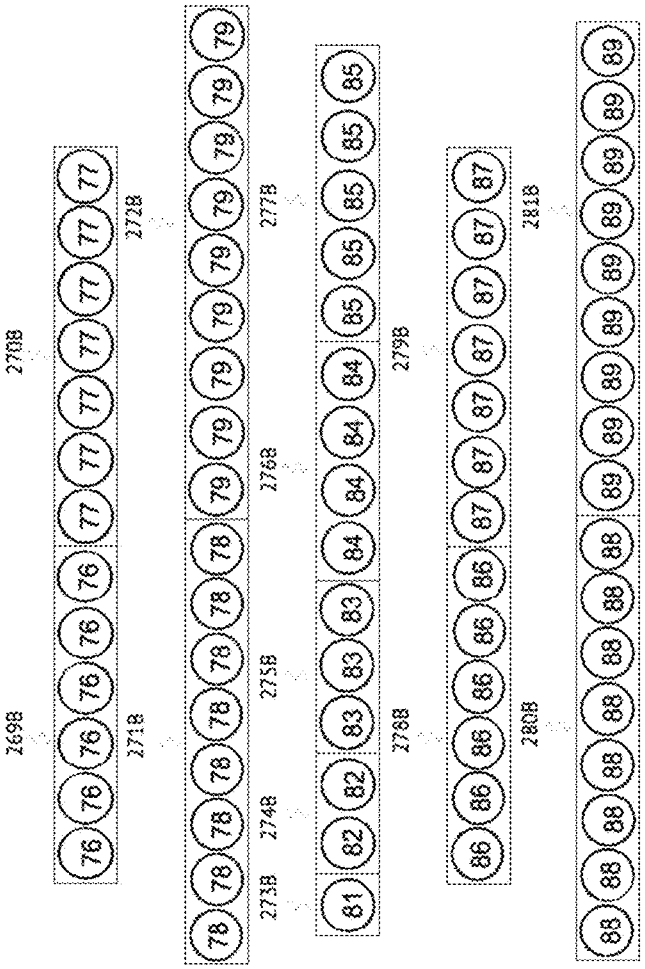
Figure 2M:
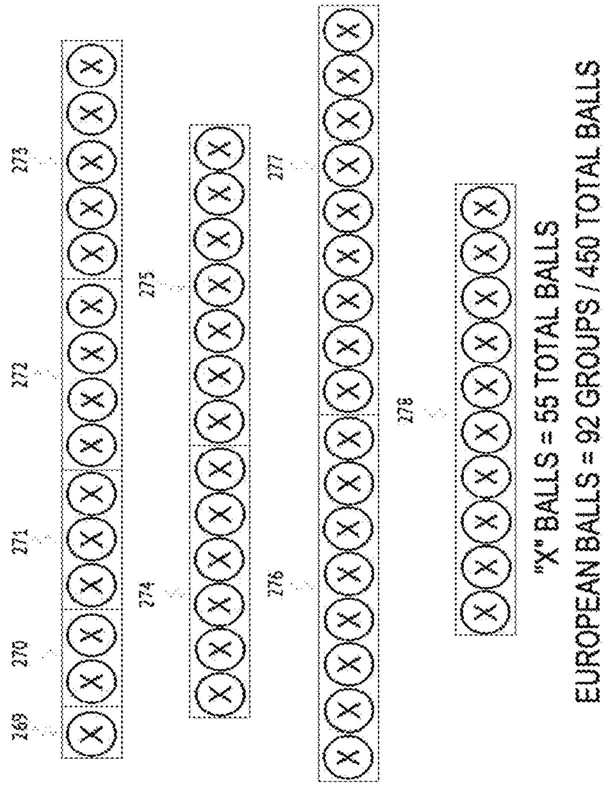

In the American embodiment, the bingo balls 200 differ from traditional bingo balls as many of the bingo balls are duplicates or repeats and not every possible ball number is included in play. In one embodiment, as shown in FIG. 2A, subsets 201-278 of the three hundred eighty-five (385) possible bingo balls form seventy-eight total groups of balls. The bingo balls in the American embodiment may or may not use letters (i.e., B-I-N-G-O). In the European embodiment, as shown in FIG. 2B, the bingo balls 200B differ from traditional bingo balls as many of the bingo balls are duplicates or repeats and not every possible ball number is included in play. In one embodiment, subsets 201B-281B of the four hundred and sixty (460) possible balls form ninety-two (92) total groups of balls. European bingo balls typically do not contain letters.

Figure 3A:
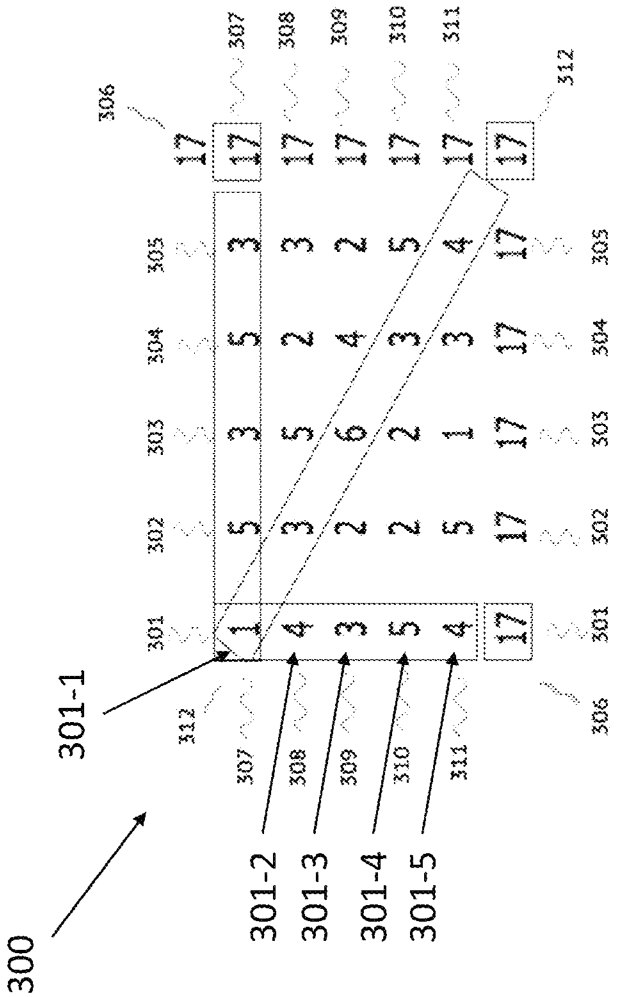
FIG. 3A illustrates American bingo card probability table according to the embodiments of the present invention.

The bingo ball sub-sets are devised using probability tables corresponding to number of bingo balls or dice used to generate the random numbers for game play. FIG. 3A shows an American bingo game probability table 300. Each probability table for every bingo game played using the bingo system according to the embodiments of the present invention replicate a corresponding bingo card matrix. For example, probability table 300 replicates American bingo card 100 having probability columns 301-305, probability rows 307-311 and probability diagonals 306, 312.

A probability number is first assigned to each square. The probability number equates to the probability that the number contained in the square will be drawn on any single draw. By way of example, the first square 301-1 in the first column 301 of the American probability table 300 depicts probability number 1 representing a 1 in 35 chance (with 35 balls in each subset); the second square 301-2 in the first column the American probability table 300 depicts probability number 4 representing a 4 in 35 chance; the third square 301-3 in the first column the American probability table 300 depicts probability number 3 representing a 3 in 35 chance; the fourth square 301-4 in the first column the American probability table 300 depicts probability number 5 representing a 5 in 35 (or 1 in 7) chance and the fifth square 301-5 in the first column the American probability table 300 depicts probability number 4 representing a 4 in 35 chance. In aggregate, the probability number of the first column 301 is 17 (1+4+3+5+4). Each probability column 301-305, row 307-311 and diagonal 306, 312 in probability table 300 has the same aggregate probability of 17. Those skilled in the art will recognize that any number of different probability tables can be generated based on the number of bingo balls in play as long as the probability associated with each column, row and diagonal is the same.

Figure 3B:
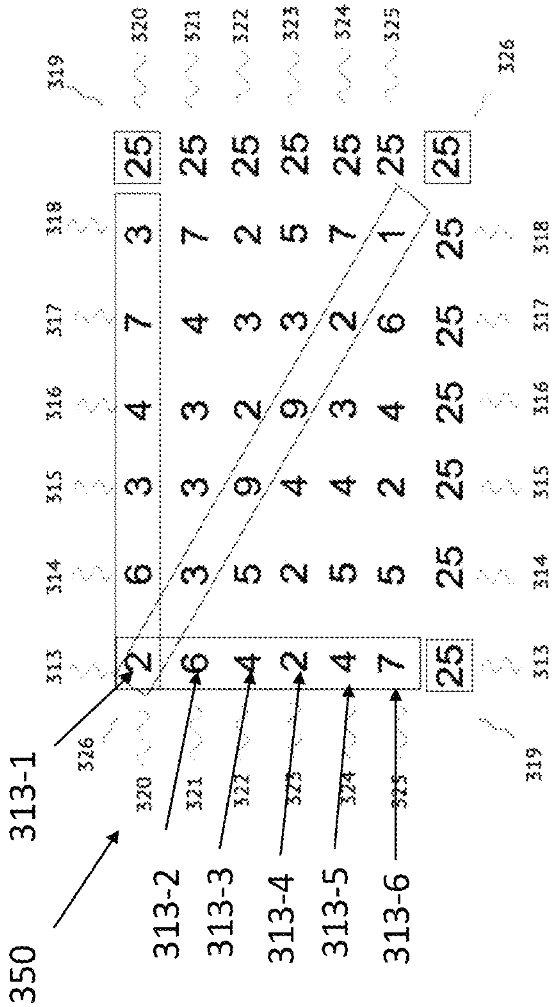
FIG. 3B illustrates European bingo card probability table according to the embodiments of the present invention.

FIG. 3B shows a European bingo game probability table 350. Probability table 350 replicates European bingo card 150 having probability columns 313-318, probability rows 320-325 and probability diagonals 319, 326. In this instance, the first square 313-1 in the first column 313 of the European probability table 350 depicts probability number 2 representing a 2 in 35 chance; the second square 313-2 in the first column the European probability table 350 depicts probability number 6 representing a 6 in 35 chance; the third square 313-3 in the first column the European probability table 350 depicts probability number 4 representing a 4 in 35 chance; the fourth square 313-4 in the first column the European probability table 350 depicts probability number 2 representing a 2 in 35 chance; the fifth square 313-5 in the first column the European probability table 350 depicts probability number representing a 4 in 35 chance and the sixth square 313-6 in the first column the European probability table 350 depicts probability number 7 representing a 4 in 35 chance. In aggregate, the probability number of the first column 313 is 25 (2+6+4+2+4+7). Each probability column 301-305, row 307-311 and diagonal 306, 312 in probability table 300 has the same aggregate probability of 25. Those skilled in the art will recognize that any number of different probability tables can be generated based on the number of bingo balls in play as long as the probability associated with each column, row and diagonal is the same.

Figure 4:
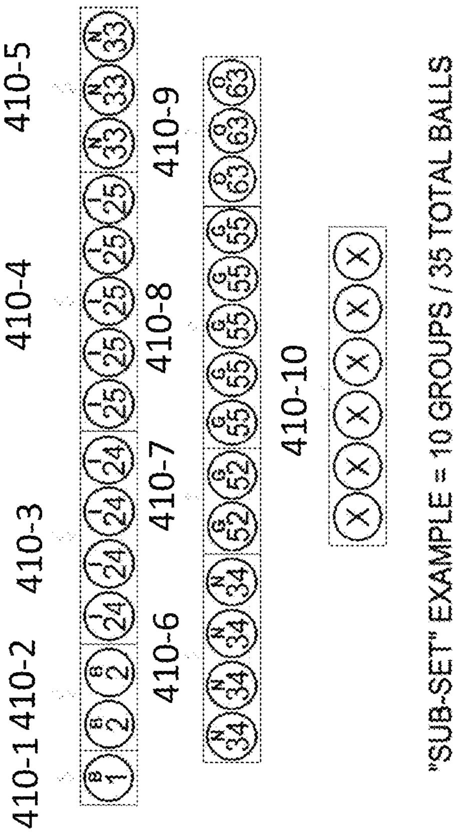
FIG. 4 illustrates exemplary group formed of ten sub-groups of bingo balls according to the embodiments of the present invention.

In one embodiment, as shown in FIG. 4, a ball subset 400 contains thirty-five balls. Those skilled in the art will recognize that ball subsets may contain any number of balls contingent upon each column, row and diagonal of the corresponding bingo card having the same probability of being a bingo. In one embodiment, as shown in FIG. 4, the ball subset 400 contains ten groups 410-1 through 410-10 of identically marked bingo balls. While ten groups are shown, those skilled in the art will recognize that the number of groups may be more or less than ten. Each ball subset contains a group of X-marked balls (e.g., 410-10). The X-marked balls are used to manipulate and formulate the probabilities. While six X-marked bingo balls are shown in FIG. 4, those skilled in the art will recognize that the number of X-marked bingo balls may be more or less than six. Moreover, while an X is shown, any other non-number symbol may be used to represent a strike.

Regardless of the number of bingo balls in a subset, the number of X-marked bingo balls, and the number of groups forming the bingo ball subset, it is the total number of balls in the subset and the number of balls in each group that dictate the probability of any single bingo ball being selected on a given draw. By way of example, if there are six X-marked bingo balls in a subset containing thirty-five total balls, the probability of an X-marked bingo ball being selected on any random draw is 6 in 35 or 1 in 5.83.

Aside from the X-marked bingo balls, the other bingo balls are marked with at least numbers and optionally letters. In one embodiment, the last digit of any bingo ball number (American or European embodiment) represents the probability of that bingo ball number occurring, stated as "X" divided by "Y" where X is the number of bingo balls in the group and Y is the number of bingo balls in the subset. By way of example, a ball numbered I25 401-4 in a subset comprising thirty-five balls indicates that the ball numbered I25 401-4 forms part of the "I" group of balls consisting of five total balls. Thus, the probability of the I25 ball 401-4 being selected on any one random draw is 5 in 35 or 1 in 7.

In one embodiment of the present invention, the objective of the bingo game facilitated by the bingo system is to obtain as many bingos as possible during a game. Bingos are typically defined as fully daubed/marked columns, rows and diagonals. However, other bingo patterns can be defined.

In one embodiment of the present invention, players play against a pay table established with a built-in house advantage. In such an embodiment, players purchase a bingo card and random numbers are generated manually or automatically using dice or bingo balls. A pay table establishes payouts related to the number of bingos achieved during a number of random generating events. The payouts may be multiples (e.g., ½×, 2×, 3× and 5×) of the purchase price of the bingo card.

In another embodiment of the present invention, players play against other players tournament style. In such an embodiment, each player purchases the same bingo card and the one or more players with the most bingos achieved during game play share in a prize pool formed from the collective bingo card purchases. Each player rolls his own dice or selects his own bingo balls. A portion of the prize pool is also held by the house as its fee. Players are ranked by total bingos with a total number of daubs/marks acting a tiebreaker. A preestablished number or percentage of top players share in the prize pool.

The single player game and multiple players game share certain common features. First, a total number of random generating events for each player is dictated by the occurrence of strikes. As detailed above, when using two six-sided dice, the number "7" is deemed a strike and when using bingo balls, the X-marked bingo balls are strikes. In one embodiment, 3 strikes end an American game for a player and 6 strikes ends a European game for a player such that no more random events may be generated for such players. Second, when a number is selected and more than one such number is depicted on the bingo card, the player must select which one of the multiple numbers to daub/mark thereby adding a skill component to the game. That is, in one embodiment, players may only daub/mark one number responsive to each random event. Alternatively, more than one number may be daubed/marked per random event.

Figure 5:
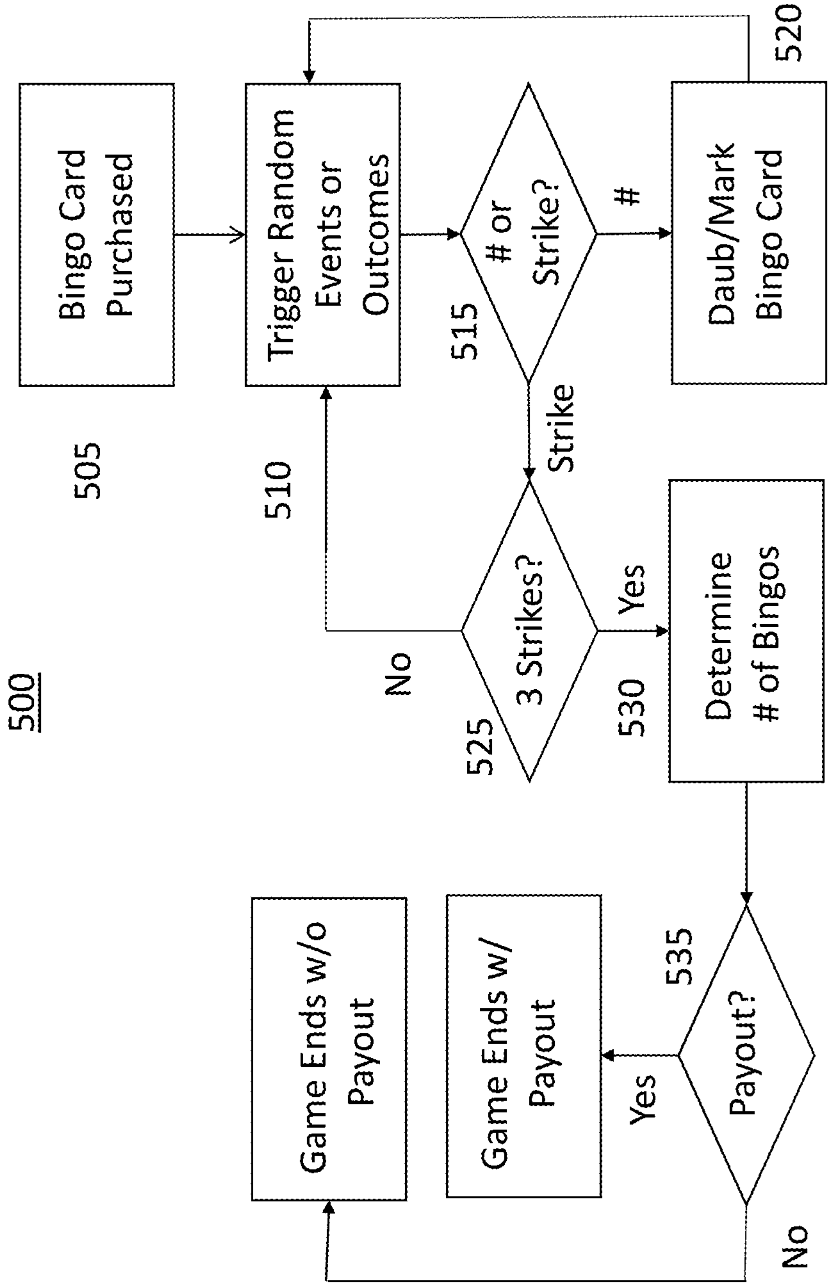
FIG. 5 illustrates a flow chart detailing one single player method of utilizing the system according to the embodiments of the present invention.

FIG. 5 shows a flow chart 500 detailing a single player electronic gaming machine (EGM) embodiment of the present invention. At 505, a player purchases a virtual bingo card using monies deposited into the EGM or from credits already stored on the EGM. At 510, the player uses a player interface (e.g., button or touchscreen) to cause random events to occur using the roll of virtual dice or virtual bingo ball draws depending on the game. At 515, it is determined if a number or strike has been generated. If a number is generated, at 520, the player uses the player interface to daub/mark the bingo card or the EGM automatically daubs/marks the bingo card. If multiple of the same number are on the bingo card, the player selects which one to daub/mark. If the system is automated, the player may default to the player, randomly select one of the numbers or select the one resulting in a bingo or closest bingo outcome. If a strike is generated, at 525, it is determined if three strikes have been generated. If not, the flowchart 500 loops back to 510. If, at 525, it is determined that three strikes have been generated, the system moves to 530 to determine a number of bingos achieved. At 535, it is determined if the number of bingos requires a payout. If so, at 540, a payout is made from a pay table. If not, at 545, the game ends without any payout.

Figure 6:
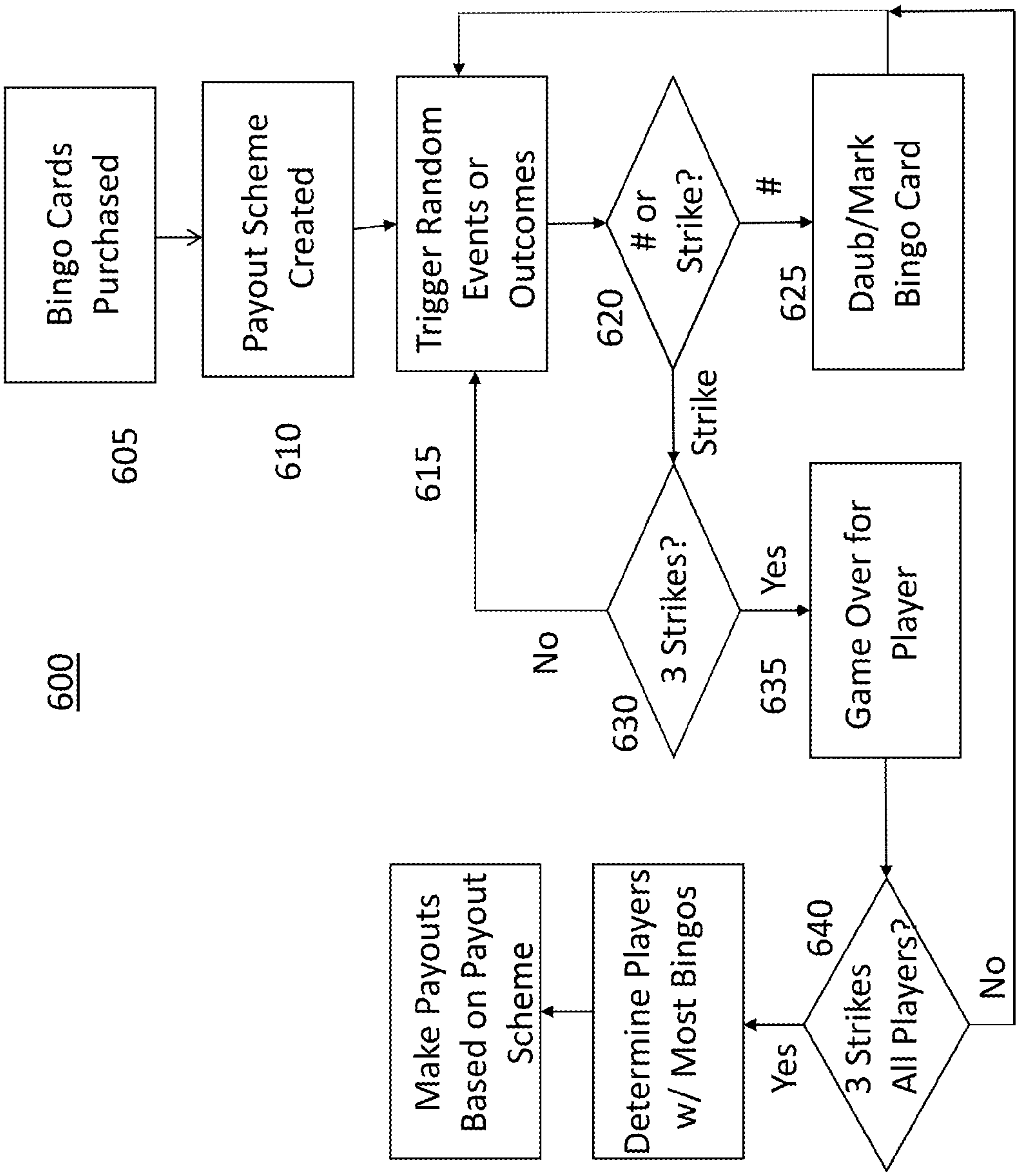
FIG. 6 illustrates a flow chart detailing one multiplayer method of utilizing the system according to the embodiments of the present invention.

FIG. 6 shows a flow chart 600 detailing a multiplayer electronic gaming machine (EGM) embodiment of the present invention. At 605, multiple players purchase the same virtual bingo card using monies deposited into a networked EGM or from credits already stored on the subject EGM. At 610, based on the number of players, the system creates a payout scheme (e.g., top 3 (10% of players) share in a prize pool 60%, 30% and 10% each). At 615, each player uses a player interface (e.g., button or touchscreen) on his or her EGM to cause random events to occur using the roll of virtual dice or virtual bingo ball draws depending on the game. At 620, for each player, it is determined if a number or strike has been generated. If a number is generated, at 625, the player uses the player interface to daub/mark the bingo card or the EGM automatically daubs/marks the bingo card. If multiple of the same number are on the bingo card, the player selects which one to daub/mark. If the system is automated, the player may default to the player, randomly select one of the numbers or select the one resulting in a bingo or closest bingo outcome. If a strike is generated, at 630, it is determined if three strikes have been generated for that player. If so, at 635, the game ends for that player. At 640, it is determined if all players have received three strikes. If not, the flowchart 600 loops back to 615. If so, at 645, it is determined which players have achieved the most bingos. At 650, the payouts are made via the EGMs of the top 3 players.

Although the invention has been described in detail with reference to several embodiments, additional variations and modifications exist within the scope and spirit of the invention as described and defined in the following claims.

I claim:

1. A bingo game system comprising:

an electronic gaming machine having a processor, memory, display, interface, means for accepting monetary consideration;

a random generator configured generate random outcomes, said random outcomes selected from a subset of bingo balls formed of groups of like numbers including a group of strikes;

at least one virtual bingo card comprising a matrix of numbers corresponding to said subset of bingo balls and positioned in a manner where each column, row and diagonal depicted on said virtual bingo card has an equal probability of achieving a bingo, said at least one virtual bingo card having at least one instance of a like number depicted more than once; and wherein said processor is configured to (i) cause said random generator to select a random bingo ball based on a player input or automatically; (ii) daub/mark said virtual bingo card based on said individual random outcomes wherein if multiple same outcomes are depicted on said bingo card, automatically select one such outcome based on a preestablished rule or a player input selection; (iii) continue steps (i) and (ii) until a preestablished number of random strikes are generated; (iv) once a preestablished number of strikes have been generated, determine a number of bingos obtained on said bingo card and (v) pursuant to a pay table, make a payout responsive to said number of bingos exceeding a threshold amount.

2. The bingo system of claim 1 wherein said matrix of numbers is a 5×5 matrix or a 6×6 matrix.

3. The bingo system of claim 2 wherein a preestablished number of strikes associated with said 5×5 matrix is three and six for the said 6×6 matrix.

4. The bingo system of claim 1 wherein the preestablished rule is to mark said one such outcome (i) randomly or (ii) in a manner to form a bingo if available or form closest to a bingo if a bingo is unavailable.

5. The bingo system of claim 1 wherein said virtual bingo card includes at least one instance of each number from said subset of bingo balls formed of said groups of said like numbers.

6. A bingo game system comprising:

an electronic gaming machine having a processor, memory, display, interface, means for accepting monetary consideration;

a random generator configured generate random outcomes, said random outcomes determined by a sum of roll of a plurality of virtual dice with at least one sum deemed a strike;

at least one virtual bingo card comprising a matrix of numbers corresponding to the possible outcomes of a roll of said plurality of dice and positioned in a manner where each column, row and diagonal depicted on said virtual bingo card has an equal probability of achieving a bingo, said at least one virtual bingo card having at least one instance of a like number depicted more than once; and wherein said processor is configured to (i) cause said random generator to randomly generate a number based on a roll of said plurality of virtual dice based on a player input or automatically; (ii) daub/mark said virtual bingo card based on said individual random outcomes wherein if multiple same outcomes are depicted on said bingo card, automatically select one such outcome based on a preestablished rule or a player input selection; (iii) continue steps (i) and (ii) until a preestablished number of random strikes are generated; (iv) once a preestablished number of strikes have been generated, determine a number of bingos obtained on said bingo card and (v) pursuant to a pay table, make a payout responsive to said number of bingos exceeding a threshold amount.

7. The bingo system of claim 6 wherein the preestablished rule is to mark said one such outcome (i) randomly or (ii) in a manner to form a bingo if available or form closest to a bingo if a bingo is unavailable.

8. The bingo system of claim 6 wherein said plurality of dice comprises two virtual six-sided dice.

9. The bingo system of claim 8 wherein a sum of 7 is deemed said strike.

10. The bingo system of claim 8 wherein said virtual bingo card includes at least one instance of each number possible with a roll of said two virtual six-sided dice.

11. A bingo game system comprising:

a plurality of networked electronic gaming machines each having a processor, memory, display, interface, means for accepting monetary consideration;

a random generator configured to generate random outcomes including numbers and strikes;

at least one virtual bingo card comprising a matrix of numbers configured in a manner where each column, row and diagonal depicted on said virtual bingo card has an equal probability of achieving a bingo, said at least one virtual bingo card having at least one instance of a like number depicted more than once; and wherein said processor of each networked electronic gaming machine is configured to (i) cause said means for generating random outcomes to generate individual random outcomes based on either a player input or automatically; (ii) daub/mark said virtual bingo card based on said individual random outcomes wherein if multiple same outcomes are depicted on said bingo card, automatically select one such outcome based on a preestablished rule or a player input selection; (iii) continue steps (i) and (ii) until a preestablished number of strikes are generated and (iv) determine a number of bingos obtained on said bingo card; and wherein a system processor: (i) determines a prize pool payout scheme based on a total number of players; (ii) responsive to each of said players obtaining said preestablished strikes, determines, based on a number of bingos for each player, winning players corresponding to said payout scheme and (iii) makes payouts to said winning players based on said payout scheme.

12. The bingo game system of claim 11 wherein said random number generator generates outcomes based on a subset of bingo balls formed of groups of like numbers including a group of strikes.

13. The bingo system of claim 12 wherein said virtual bingo card includes at least one instance of each number from said subset of bingo balls formed of said groups of said like numbers.

14. The bingo game system of claim 11 wherein said random number generator generates outcomes determined by a sum of roll of a plurality of virtual dice with at least one sum deemed a strike.

15. The bingo system of claim 14 wherein a sum of 7 is deemed said strike.

16. The bingo system of claim 14 wherein said virtual bingo card includes at least one instance of each number possible with a roll of said two virtual six-sided dice.

* * * * *